United States Patent [19]
Yost, Jr.

[11] 3,798,033
[45] Mar. 19, 1974

[54] ISOLUMINOUS ADDITIVE COLOR MULTISPECTRAL DISPLAY

[75] Inventor: Edward F. Yost, Jr., Northport, N.Y.

[73] Assignee: Spectral Data Corporation, Hauppauge, N.Y.

[22] Filed: May 11, 1971

[21] Appl. No.: 142,232

[52] U.S. Cl.............................. 96/5, 96/17, 96/24, 40/106.1, 355/37
[51] Int. Cl.... G03c 5/08, G03b 27/04, G03b 33/06
[58] Field of Search......... 96/5, 17, 27 R, 2; 355/37

[56] References Cited
UNITED STATES PATENTS
2,244,992  6/1947  Guerrero.................................. 96/5

Primary Examiner—Norman G. Torchin
Assistant Examiner—Alfonso T. Suro Pico
Attorney, Agent, or Firm—Eliot S. Gerber

[57] ABSTRACT

Each of a set of multispectral photographic negatives of a given scene is made by exposure to radiation from the scene primarily in a different spectral region, and each has substantially the same gamma. From each negative a positive mask is formed of which the gamma substantially equals minus one times the gamma of the negatives divided by one less than the number of negatives in the set. Each negative is subtractively combined in register with each positive mask made from the other negatives of the set. This forms a set of masked positives which correspond respectively to the negatives and in each of which density distribution is a function substantially exclusively of the hue and saturation distribution in the scene in the corresponding spectral region. The masked positives are combined additively in a color viewer to provide an improved multispectral display.

2 Claims, 11 Drawing Figures

ISOLUMINOUS ADDITIVE COLOR MULTISPECTRAL DISPLAY

BACKGROUND OF THE INVENTION

This invention relates to photography and, in particular, to novel and highly effective multispectral photography wherein a composite additive color display of substantially uniform brightness is generated.

In multispectral photography as practiced heretofore, a given scene is photographed in black-and-white simultaneously and from the same perspective by a number of cameras—typically four. The four camera lenses are precisely matched as to field distortion and focal length and may be mounted for convenience in a single housing. Each lens transmits light in a different spectral region: for example, blue, green, red and infrared. The selective transmission characteristics of the lenses are readily established by the use of conventional filters.

Negatives are developed from the four photographs, and a positive is made from each negative. The positives, or a selected number of them, for example three, are projected simultaneously by separate projection lenses in an additive color viewer to form a composite image on a projection screen for viewing. Separate filters are associated with the several projection lenses so that the composite image is in color—true color if the filters associated with the several projection lenses have the same characteristics respectively as the filters associated with the corresponding camera lenses, and false color if they have not.

Multispectral photography as briefly explained above is a powerful remote-sensing technique facilitating the collection of a great deal of information from aircraft or satellites regarding vegetation and soil conditions, mineral deposits, water pollution and a multitude of other phenomena. However, where the illumination of a scene is highly variable or where the brightness of the scene is very great as compared to the differences in hue and saturation, the detection of spectral differences becomes relatively difficult.

SUMMARY OF THE INVENTION

An object of the invention is to remedy the problem outlined above and, in particular, to provide for multispectral photography wherein the effects of brightness are subdued and subtle differences in hue and saturation are greatly enhanced.

The foregoing and other objects are attained by a special preparation for additive color viewing of a set of multispectral photographic negatives of a given scene wherein each negative is made by exposure to radiation from the scene primarily in a different spectral region and has substantially the same gamma. In accordance with the invention, a positive mask is formed from each of the negatives. The gamma of each positive mask substantially equals minus one times the gamma of the negatives divided by one less than the number of negatives in the set. Each negative is subtractively combined in register with each positive mask made from the other negatives of the set. This forms a set of masked positives which correspond respectively to the negatives and in which density distribution is a function substantially exclusively of the hue and saturation distribution in the scene in the corresponding spectral region. The masked positives are used to form an additive color composite image wherein brightness is substantially constant and differences in hue and saturation are accentuated.

BRIEF DESCRIPTION OF THE DRAWING

An understanding of other aspects of the invention can be gained from a consideration of the following detailed description of the preferred embodiments thereof, in conjunction with the appended figures of the drawing, wherein.

DESCRIPTION OF THE PREFERRED EMBODIMENTS

Figure 1A:
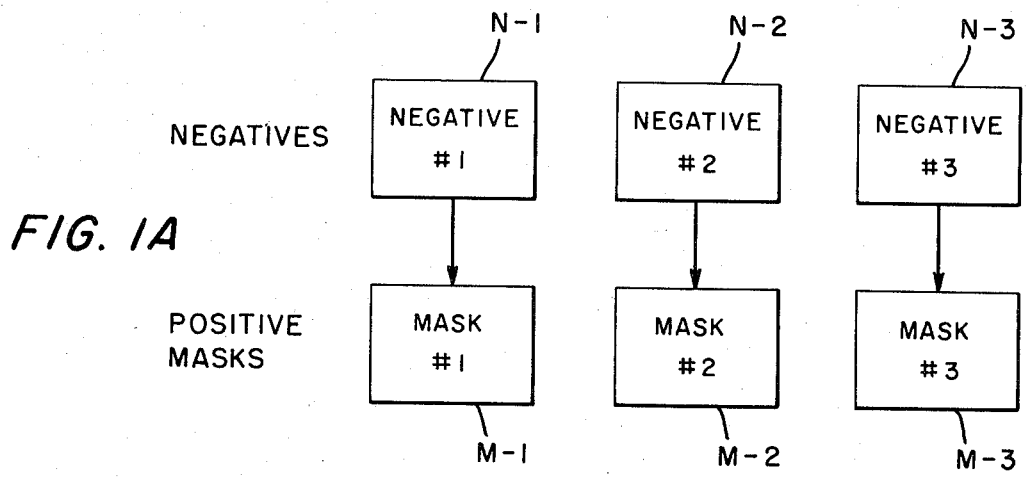
FIG. 1A is a schematic view showing the preparation of positive masks in accordance with the invention from a set of corresponding multispectral photographic negatives.

FIG. 1A shows a step in the preparation for additive color viewing of a set of multispectral photographic negatives N–1, N–2 and N–3 of a given scene. In accordance with usual multispectral techniques, each negative is made by exposure to radiation from the scene primarily in a different spectral region. For example, the negative N–1 may be made by exposure to radiation from the scene primarily in the blue region of the spectrum; the negative N–2 may be made by exposure to radiation from the scene primarily in the green region of the spectrum; and the negative N—3 may be made by exposure to radiation from the scene primarily in the red region of the spectrum. The set as photographed may have any number of negatives in it, and, in particular, it often has at least a fourth negative (not shown), made by exposure to radiation from the scene in the infrared. Each negative of the set has the same characteristic curve, at least in the straight-line portion, and therefore the same gamma, which is defined as the slope of the straight-line portion of the characteristic curve. From the several negatives, positive masks M-1, M-2 and M-3 are respectively formed, preferably by contact printing, each positive mask having the same characteristic curve and the same gamma as every other positive mask, but the gamma of the positive masks being different from the gamma of the negatives and related to the gamma of the negatives by a formula that depends on the number of negatives in the set.

Figure 2A:
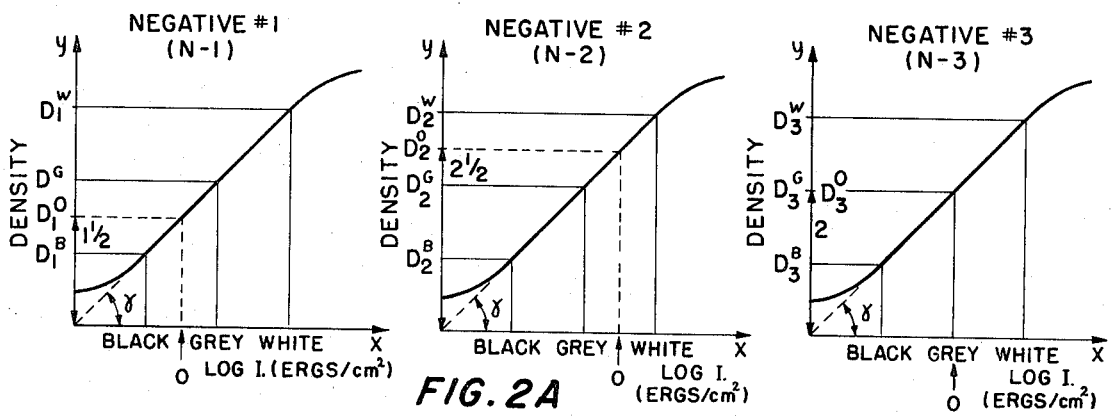
FIG. 2A is a triple graph showing, for each of the negatives of FIGS. 1A and 1B, the characteristic curves and the positions on the curves of a hypothetical object in the photographed scene.
Figure 2B:
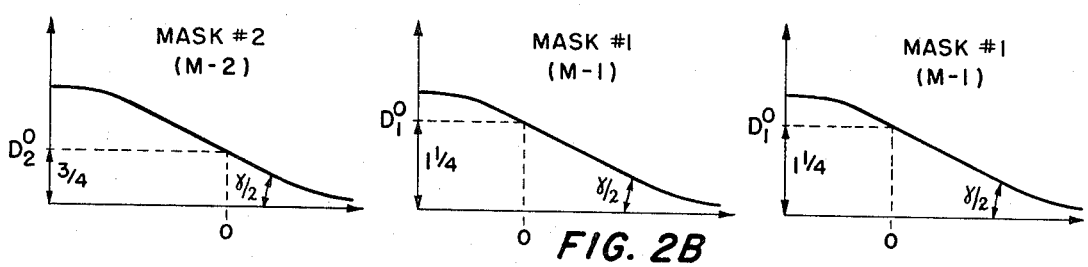
FIGS. 2B and 2C are multiple graphs showing, for each of the positive masks of FIGS. 1A and 1B, half-gamma curves and the positions on the curves of the hypothetical object.
Figure 2C:
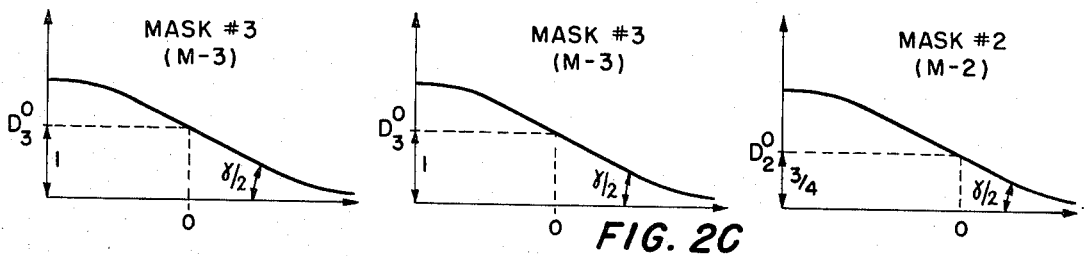

As FIGS. 2A, 2B and 2C show, the gamma of each negative can be regarded as $\gamma$ (since, if $y = \gamma x$, where $x$ and $y$ are variables and $\gamma$ is a constant, $dy/dx = \gamma$), and the gamma of each positive mask can be regarded as $-\gamma/2$ (since, if $y = -\gamma x/2$ plus a constant, $dy/dx = -\gamma/2$). In general, the gamma of each positive mask is chosen so that it substantially equals minus one times the gamma of the negatives divided by one less than the number of negatives in the set. The size of the set in question equals the number of photographs to be simultaneously projected, and not necessarily the number of photographs that were originally taken simultaneously. In the particular embodiment illustrated in the drawings, the number of negatives in the set to be projected is three, one less than that number is two, and the gamma of the masks is therefor minus one times one-half the gamma of the negatives. It will be shown below that the invention is broad enough to be used regardless of the number of negatives in the set.

Figure 1B:
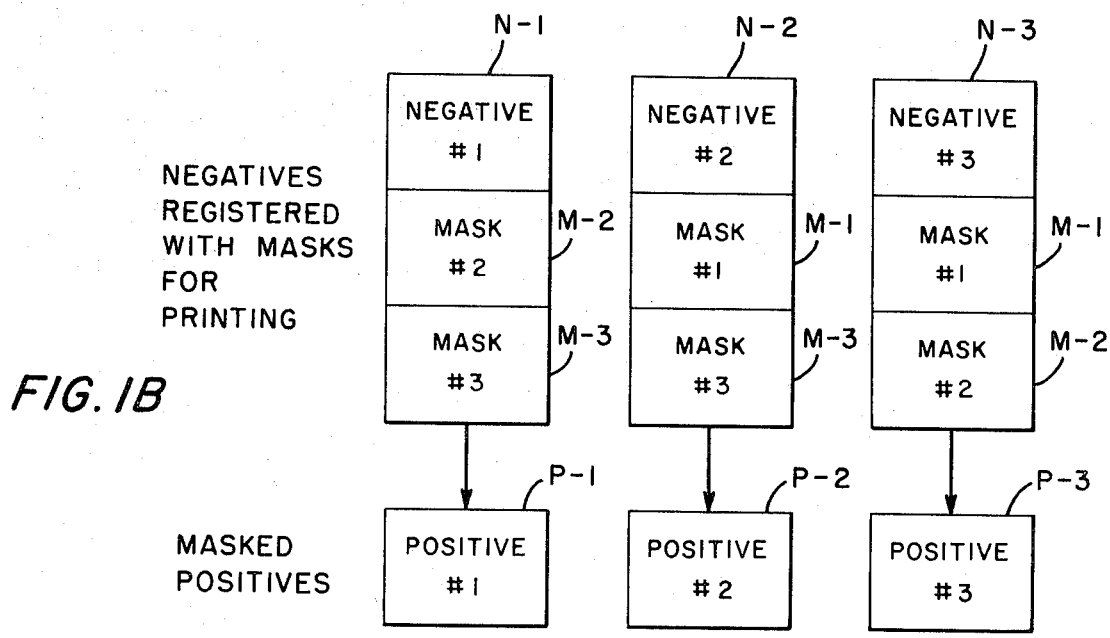
FIG. 1B is a schematic view showing the preparation in accordance with the invention of a set of masked positives respectively corresponding to the negatives by subtractively combining each negative in register with each positive mask made from the other negatives of the set.

As FIG. 1B shows, each negative N-1, N-2 and N-3 is subtractively combined in register with each positive mask made from the other negatives of the set. That is, the negative is subtractively combined with the masks M-2 and M-3; the negative N-2 is subtractively combined with the masks M-1 and M-3; and the negative N-3 is subtractively combined with the masks M-1 and M-2. This forms a set of masked positives P-1, P-2 and P-3 corresponding, respectively, to the negatives N-1, N-2 and N-3. In the masked positives, density distribution is a function substantially exclusively of the hue and saturation distribution in the scene in the corresponding spectral region, since the gamma of each negative equals in absolute value the sum of the gammas of the positive masks with which it is subtractively combined and brightness differences are substantially cancelled.

FIG. 2A shows the characteristic curves of the negatives N-1, N-2 and N-3. Each of the triple graphs plots density on the ordinate or y axis as a function of the logarithm of the intensity (in ergs per square centimenter) on the abscissa or x axis. On the x axis, log intensities corresponding to "black," "grey" and "white" are indicated, and, on the y axis, corresponding densities $D^B$, $D^G$ and $D^W$ are indicated, subscripts 1, 2 and 3 being used in the case of the negatives N-1, N-2 and N-3, respectively. Also on the x axis of each graph, the log intensity associated with a hypothetical object O in the scene is indicated, and, on the y axis, a corresponding density $D^O$. Again, subscripts 1, 2 and 3 are used in the case of the negatives N-1, N-2 and N-3, respectively. On the arbitrary density scale chosen, the density associated with the object O is 1½ in the case of negative N-1, 2½ in the case of negative N-2, and 2 in the case of negative N-3. The hypothetical object O in the scene is thus between "black" and "grey" on negative N-1, between "grey" and "white" on negative N-2 and at "grey" on negative N-3. These positions are a function of the filters associated with the lenses used in forming the images on the negatives and of the spectral characteristics of the object.

FIGS. 2B and 2C show the characteristic curves of the positive masks M-2 and M-3 subtractively combined in register with the negative N-1; of the positive masks M-1 and M-3 subtractively combined in register with the negative N-2; and of the positive masks M-1 and M-2 subtractively combined in register with the negative N-3.

Consider first the subtractive combination of the negative N-1, the mask M-2 and the mask M-3. As noted above, the object O is recorded on the characteristic curve of the negative N-1 between "black" and "grey" and the corresponding density $D_1^O$ is 1½. In the case of the mask M-2, the object O is at the same position on the $x$ axis as it is on the $x$ axis in the case of the negative N-2 from which the mask M-2 is made: i.e., between "grey" and "white." Because the characteristic curve has a negative rather than a positive slope, and because the gamma is one-half the gamma of the negative N-2, the corresponding object density will, in general, be different. In this case, the density $D_2^O$ is three-fourths. In the case of the mask M-3, the object O is at the same position on the $x$ axis as it is on the $x$ axis in the case of the negative N-3 from which the mask M-3 is made: i.e., at "grey." The corresponding density $D_3^O$ is one.

Figure 2D:
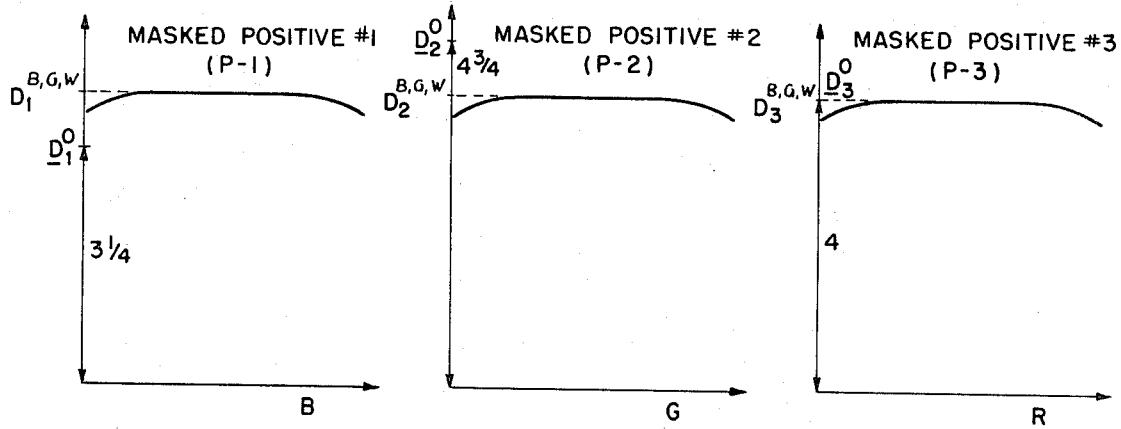
FIG. 2D is a triple graph showing the (constant) density of all colorless objects, regardless of brightness, on three masked positives of FIG. 1B and also showing the density of the hypothetical object as recorded on the three masked positives.

As FIG. 2D shows, the density corresponding to the object O is $D_1^O = 3¼$, which is the sum of $D_1^O = 1½$, contributed by the negative N-1; $D_2^O = ¾$, contributed by the mask M-2; and $D_3^O = 1$, contributed by the mask M-3.

A similar analysis shows that the object has a density $D_2^O = 4¾$ on the masked positive P-2 abd a density $D_3^O = 4$ on the masked positive P-3.

FIG. 2D also shows for the masked positive P-1 a graph representing the density of all colorless objects, regardless of brightness. A colorless object has the same x-coordinate on each of the three negatives and therefore on each of the positive masks. It is easy to see from inspection of the graphs that the density sum for all such objects on all of the masked positives (or the arbitrary scale chosen) is 4. For example, for "black," "grey," and "white," respectively, we have $1 + 2(1.5) = 4$; $2 + 2(1) = 4$; and $3 + 2(½) = 4$.

Figure 2:
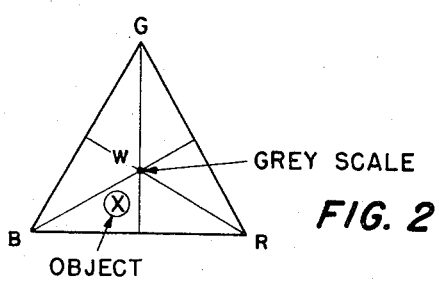
FIG. 2 is a diagram showing the position of the hypothetical object in color space as it appears when the masked positives are projected simultaneously and additively to form a composite image for viewing, the projection filters being blue, green and red in the case of masked positives 1, 2 and 3, respectively.

FIG. 2 shows the position in color space of the object O upon projection of the masked positives P-1, P-2 and P-3 simultaneously and additively through blue, green and red filters, respectively. Since the density $D_1^O$ is 3¼, which is less than the density $D_1^{BGW}$ (the density for all colorless objects), the blue filter passes more light than it would pass if the object O were at "grey" in masked positive P-1. The circled X representing the position of the object O in color space is thus displaced towards the blue vertex of the color space diagram. The density $D_2^O$ is 4¾, which is more than the density $D_2^{BGW}$. The green filter thus transmits less light corresponding to the object O than it would if the object were at "grey" in masked positive P-2, and the position ⊗ of the object is displaced, relative to the black, grey and white point W, in a direction away from the green vertex of the diagram. In the case of the positive P-3, the density $D_3^o$ is 4, which is the same as the density $D_3^{BGW}$ corresponding to all colorless objects, and therefore the red filter transmits the same amount of light corresponding to the object O as it would transmit for any object of neutral density. The position ⊗ of the object O in the diagram of FIG. 2E is thus displaced neither towards nor away from the red vertex. In the additive color presentation the object is thus perceived as bluish-magenta. This is the true color of the object if and only if the projection filters are respectively the same as the filters used in taking the photographs. Otherwise the object is represented in false color.

Figure 3A:
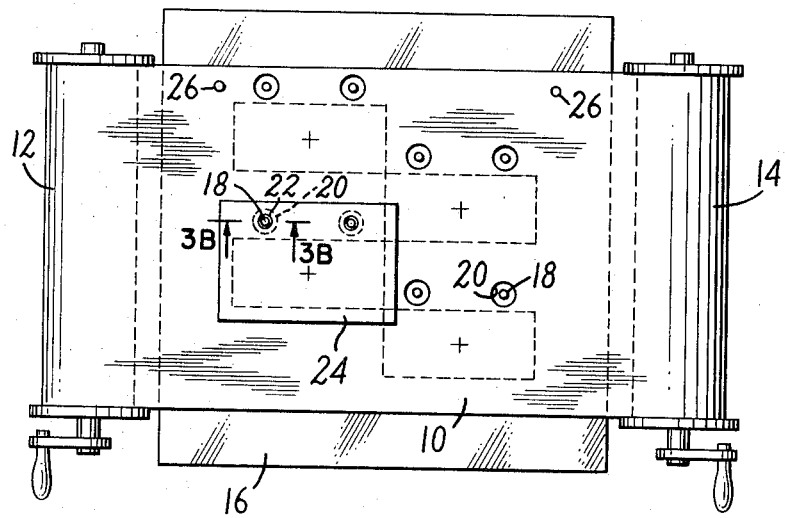
FIG. 3A is a top plan view of apparatus for registering and exposing the positive masks and masked positives made in accordance with the invention.
Figure 3B:
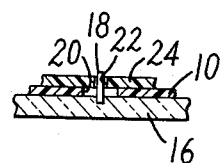
FIG. 3B is a fragmentary sectional view taken along the lines 3B—3B of FIG. 3A and looking in the direction of the arrows.

FIG. 3A shows in top plan view apparatus for registering and exposing the positive masks M-1, M-2 and M-3 and the masked positives P-1, P-2 and P-3 for printing. A strip of film 10 is transported between spools 12 and 14 over a glass printing platen 16. Registration pins 18 in the platen 16 extend through holes 20 in the film 10. The holes 20 are of larger diameter than the pins 18. The pins 18 cooperate with holes 22 in a mask 24. In order to hold the set of four negatives securely, without motion, another set of registering pins 26 is used. This maintains the principal points and, in fact, all images on the set of four multispectral photographs in the same relative location during the printing process.

Figure 3C:
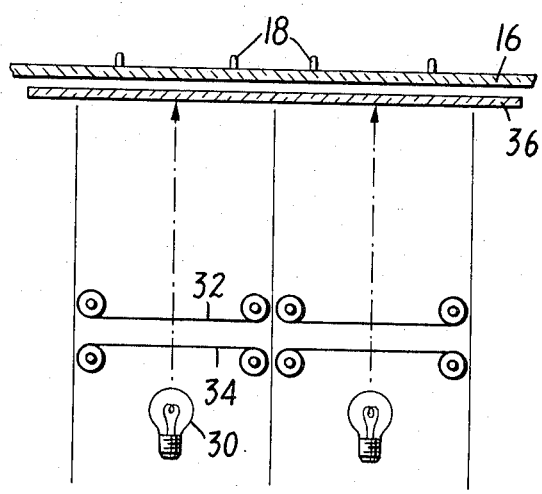
FIGS. 3C and 3D are schematic side and end elevational views, partly in section, of the apparatus of FIG. 3A.
Figure 3D:
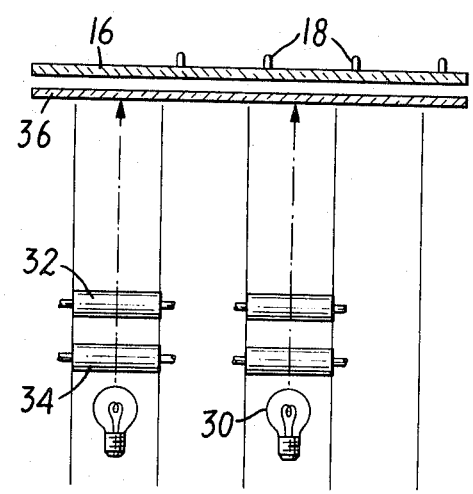

Unexposed film 24 is pre-punched by a conventional punch (not shown) and registered on the pins 18 for the individual frames. The film is exposed using the light arrangements shown in FIGS. 3C and 3D. Lamps 30 can be controlled in intensity by continuously variable neutral-density film strips 32, 34. After exposure, the positive masks are developed without moving the negative. The masks are then placed on the other negatives with which they are associated as shown in FIG. 1B and in FIGS. 2A, 2B and 2C, and the masked positives P-1, P-2 and P-3 for projection are produced by contact printing. As a guide in exposure, a frosted glass plate 36 can be slid in and out beneath the film printing platen 16.

Thus there are provided in accordance with the invention novel and highly effective photographs for additive color display and a method and apparatus facilitating preparation of the photographs. Many modifications within the spirit and scope of the invention of the representative embodiments described herein will readily occur to those skilled in the art upon reading the present disclosure. For example, it is possible to use the technique with two negatives, three negatives, four negatives or more, provided only that the masks are constructed so that the gammas substantially cancel brightness differences. In the case of a two-negative constant brightness display, the masks are made at unity gamma, since the gamma of either negative is then matched by the gamma of the mask made from the other negative. In the case illustrated in the drawings, in which three negatives are used, each mask is at one-half gamma, since gamma of any negative is equal (except for its sign) to the sum of the gammas of the masks made from the other negatives. Similarly, in the case where four negatives are used, the masks must be made at one-third gamma, since the gamma of any negative would then be equal (except for sign) to the sum of the gammas of the masks made from the other three negatives.

Accordingly, the invention is to be construed as including all of the embodiments thereof within the scope of the appended claims.

I claim:

1. A method for constructing an isoluminous multispectral display from a set of masked positives of a given scene, wherein the density distribution in each masked positive is the function substantially exclusively of the hue and saturation distribution of said scene in a different spectral region, consisting of:
    a. exposing the black-and-white negative film of the same scene using a set of not less than three different colored filters, to obtain a set of separate negatives with approximately the same gamma;
    b. making a positive mask from each negative in the set by printing and processing the positive film to a gamma substantially equal minus one times the gamma of the other negatives ivided by one less then the number of negatives in the set;
    c. combining subtractively and in register each negative with the positive mask from each of the other negatives in the set, printing these combinations onto positive black-and-white film and processing to form a set of masked positives; and
    d. additively combining the set of masked positives in the color viewer.

2. The method of claim 1 wherein the masked positives of said scene are combined additively by means of a projector.

* * * * *